United States Patent
Sharifie et al.

(10) Patent No.: US 9,170,755 B2
(45) Date of Patent: Oct. 27, 2015

(54) COMMAND AND DATA SELECTION IN STORAGE CONTROLLER SYSTEMS

(71) Applicants: Tal Sharifie, Lehavim (IL); Shay Benisty, Beer Sheva (IL); Yair Baram, Metar (IL)

(72) Inventors: Tal Sharifie, Lehavim (IL); Shay Benisty, Beer Sheva (IL); Yair Baram, Metar (IL)

(73) Assignee: SanDisk Technologies Inc., Plano, TX (US)

( * ) Notice: Subject to any disclaimer, the term of this patent is extended or adjusted under 35 U.S.C. 154(b) by 119 days.

(21) Appl. No.: 13/898,903

(22) Filed: May 21, 2013

(65) Prior Publication Data

US 2014/0351456 A1 Nov. 27, 2014

(51) Int. Cl.
G06F 13/00 (2006.01)
G06F 3/06 (2006.01)
G06F 3/00 (2006.01)

(52) U.S. Cl.
CPC ............ *G06F 3/0659* (2013.01); *G06F 3/0613* (2013.01); *G06F 3/0671* (2013.01)

(58) Field of Classification Search
CPC .................................. G06F 13/00; G06F 3/00
USPC ............................................. 710/52–56, 310
See application file for complete search history.

(56) References Cited

U.S. PATENT DOCUMENTS

| | | | |
|---|---|---|---|
| 6,160,812 A * | 12/2000 | Bauman et al. | 370/416 |
| 6,820,162 B1 * | 11/2004 | Abe | 710/310 |
| 8,255,618 B1 | 8/2012 | Borchers et al. | |
| 8,321,627 B1 | 11/2012 | Norrie et al. | |
| 8,601,182 B2 * | 12/2013 | Nishita et al. | 710/52 |
| 2003/0023786 A1 * | 1/2003 | Craddock et al. | 710/52 |
| 2009/0019243 A1 | 1/2009 | Hur et al. | |
| 2010/0262721 A1 | 10/2010 | Asnaashari et al. | |
| 2010/0274952 A1 | 10/2010 | Lee | |
| 2011/0265098 A1 * | 10/2011 | Dozsa et al. | 719/314 |
| 2012/0079172 A1 | 3/2012 | Yoshida | |
| 2014/0181822 A1 * | 6/2014 | Beckmann et al. | 718/102 |

OTHER PUBLICATIONS

International Search Report and Written Opinion for corresponding application No. PCT/US2014/038568 mailed Aug. 14, 2014.

* cited by examiner

*Primary Examiner* — Christopher Shin
(74) *Attorney, Agent, or Firm* — Brinks Gilson & Lione

(57) ABSTRACT

A storage controller system may include a host controller that queues host commands as data transfer commands in a plurality of queue channels. The storage controller system may also include a data storage controller that selects data transfer commands for execution. The data storage controller may select all data transfer commands associated with a host command when all of the data transfer commands are located at heads of the queue channels. Alternatively, the data storage controller may select for execution data transfer commands at heads of the queue channels when associated cache areas are available to receive data, regardless of whether all of the data transfer commands associated with a host command are at the heads. The host controller may then retrieve the data in the cache areas when all of the data to be sent to the host in response to the host command is being cached.

11 Claims, 12 Drawing Sheets

COMMAND AND DATA SELECTION IN STORAGE CONTROLLER SYSTEMS

BACKGROUND

Storage systems may include a controller that handles commands received from a host. The controller may be configured to store the commands in a queue when the controller is unable to immediately execute the command. The commands may be stored in multiple channels of the queue to achieve maximum throughput. To do so, the commands may be divided into multiple sub-commands. When the individual sub-commands are executed, they may be executed at different times. That is, some of the sub-commands are executed while other sub-commands are pending in the queue.

SUMMARY

Embodiments of the present invention are defined by the claims, and nothing in this section should be taken as a limitation on those claims. By way of example, the embodiments described in this document and illustrated in the attached drawings generally relate to a storage controller system and related methods of selecting host commands queued as data transfer commands for execution and sending data in response to executing the data transfer commands to a host.

In one example, a storage controller system includes a data storage controller configured to determine that each data transfer command of one or more data transfer commands associated with a host command is located at a head of a queue channel of a plurality of queue channels or unblocked by a data transfer command associated with a different host command. The data storage controller may also be configured to select for execution all of the one or more data transfer commands associated with the host command in response to the determination.

In another example, a storage controller system includes a host controller configured to, for a received host command, identify data being stored in one or more of a plurality of cache areas, where the identified data includes data to be sent to a host in response to receipt of the host command. The host controller may also be configured to determine that the identified data being stored in the one or more of the plurality of cache areas and that is to be sent to the host in response to receipt of the host command comprises all of the data to be sent to the host in response to receipt of the host command. The host controller may retrieve the identified data from the one or more of the plurality of cache areas in response to the determination that the identified data comprises all of the data to be sent to the host in response to receipt of the host command.

In sum, a storage controller system selects data transfer commands associated with a host command stored in a queue or selects cached data to be sent to a host in response to execution of the data transfer commands such that all of the data to be sent to the host to complete execution of the host command is sent together or at substantially the same time.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

Various modifications to and equivalents of the embodiments described and shown are possible and various generic principles defined herein may be applied to these and other embodiments. Thus, the claimed invention is to be accorded the widest scope consistent with the principles, features, and teachings disclosed herein.

Figure 1:
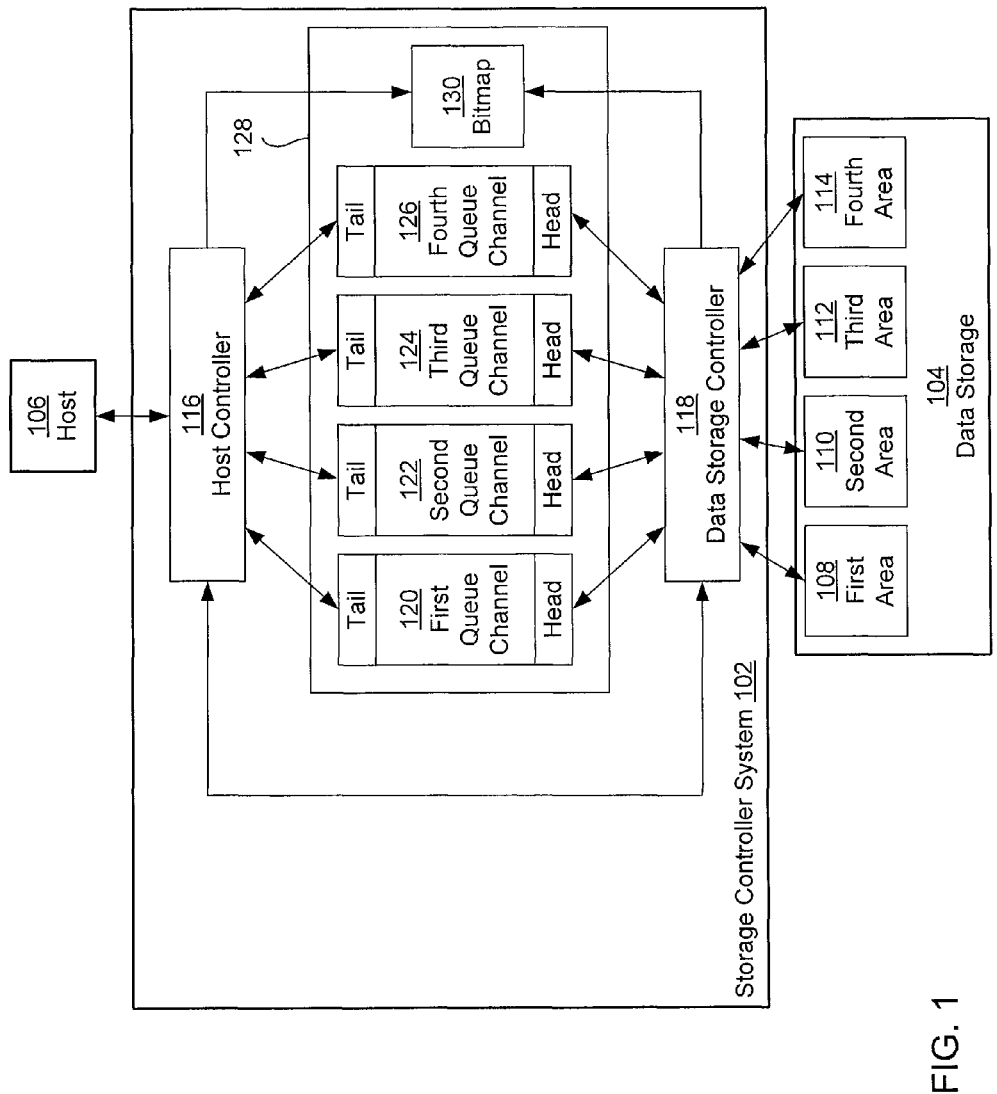
FIG. 1 is a block diagram of an example system that includes a storage controller system that executes data transfer commands in response to received host commands.

FIG. 1 shows a block diagram of a system 100 that includes an example storage controller system 102 that is configured to control or manage the storage of data in a data storage 104. The storage controller system 102 may be configured to communicate, either wirelessly or through a wired connection, with a host device or host 106 to perform data transfers. For example, the host 106 may communicate with the storage controller system 102 to read data from the data storage 104 and/or write data to the data storage 104. To perform the data transfers, the host 106 may send host commands to the storage controller system 102. Example host commands may include a read host command to read data from the data storage 104 or a write host command to write data to the data storage 104. In response to receipt of the host command, the storage controller system 102 may communicate with and/or access the data storage 104 to execute the host command. For example, in response to a read host command, the storage controller system 102 may read data from the data storage 104 and send the read data to the host 106. In response to a write host command, the storage controller system 102 may write data provided from the host 106 to the data storage 104.

The data storage 104 may include a plurality of blocks or areas 108-114 in which to store data. The data storage 104 shown in FIG. 1 includes four areas 108-114, although other numbers of areas may be used. Example areas may include dies (or dice) of one or more silicon wafers, although other types of areas are possible. Each of the areas 108-114 may have a size or a capacity, which may indicate how much data an area can store. For some example configurations, each of the areas 108-114 may be divided into sectors or blocks, and the total number of sectors or blocks of an area may indicate or be proportional to the size of that area.

The storage controller system 102 may include one or more controllers configured to perform various functions to control and manage storage of the data in the data storage 104. FIG. 1 shows the storage controller system 102 having two controllers, a host controller 116 and a data storage controller 118, to perform the various functions. Alternative example configurations of the storage controller system 102 may include or use other numbers of controllers, such as a single controller or more than two controllers, to perform the functions. Various configurations of the one or more controllers are possible.

The host controller 116 may be configured to communicate and/or interface with the host 106. For example, the host controller 116 may be configured to receive the host commands from the host 106. In addition, the host controller 116 may be configured to respond to the host 106 when execution of a host command is complete and/or to complete execution of a host command.

In addition, the host controller 116 may be configured to parse received host commands to identify or analyze the information included in the host commands. The host controller 116 may also be configured to queue at least some of the received host commands. A host command may be queued when the storage controller system 102 is unable to immediately execute the host command. For some example configurations, the host controller 116 may queue less than an entire received host command. For example, the host controller 116 may queue only information in the host command that the host controller 116 identifies as relevant or important to the transfer (e.g., the reading or writing) of the data. Information important or relevant to the data transfer may include information identifying the type of the host command (e.g., whether the host command is a read or a write command); an address, such as a base address, of the data being read or written; or a size of the data, as examples. Other information that may be important or relevant to the data transfer is possible. Hereafter, for simplicity, queuing a host command and queuing at least some information or less than all information of a queue command may be used interchangeably.

The host controller 116 may be configured to queue a received host command by storing the host command in a queue or queue system of the storage controller system 102. The queue system may include a plurality of queue channels 120-126, which may be included in a memory 128. Each of the queue channels 120-126 may correspond to and/or be associated with one of the areas 108-114 of the data storage 104. That is, each area 108-114 may have its own queue channel 120-126. For a given area and an associated queue channel, a command stored in the queue channel may indicate the area on which the command is to be performed. For example, assuming that the first queue channel 120 is associated with the first area 108, if a read command is stored in the first queue channel 120, then to execute the read command, data may be read from the first area 108. Accordingly, a one-to-one correspondence may exist between the data storage areas 108-114 and the queue channels 120-126. The number of queue channels 120-126 may be equal and/or correspond to the number of areas 108-114 included in the data storage 104. In the example configuration shown in FIG. 1, the queue system may include four queue channels 120-126 corresponding to the four areas 108-114 of the data storage 104. Other numbers of queue channels corresponding to other numbers of data storage areas may be used in alternative example configurations.

When the host controller 116 receives a host command and determines to queue the host command, the host controller 116 may be configured to determine how the host command is to be queued. To do so, the host controller 116 may determine the areas 108-114 on which to perform the data transfer in order execute the host command. The host controller 116 may then store the host command in corresponding queue channels 120-126. To determine the areas 108-114 on which to perform the data transfer, the host controller 116 may determine an initial area. For some example configurations, the host controller 116 may determine the initial area by identifying base address information in the host command. The base address information may identify a base address of the data transfer. That is, by identifying the base address, the host controller 116 may determine an initial area of the data storage 104 on which to perform the data transfer.

In addition to identifying the initial area, the host controller 116 may determine whether areas other than the initial area are to be used to perform the data transfer. The determination may be based on whether the host command is a command for the transfer of data over multiple areas, which in turn may be based on the size of the data involved in the data transfer and the size of the areas 108-114. The size of the data may be part of the information included in the received host command. If the data transfer involves multiple areas, then the host controller 116 may determine the areas other than the initial area over which to perform the data transfer. For some configurations, the determination of the other areas may be based on a pattern, such as an interleaving pattern. Alternatively, if the data transfer does not involve multiple areas, then the host controller 116 may determine that the data transfer is to be performed only using the initial area.

After determining the areas 108-114 to be used to perform the data transfer, the host controller 116 may be configured to store the host command in queue channels 120-126 corresponding to the determined areas 108-114. If the host controller 116 determines that execution of the host command involves the transfer of data over multiple areas 108-114, then the host controller 116 may be configured to divide the host command into multiple sub-host commands or data transfer commands before storing the commands in the corresponding queue channels 120-126. Each of the data transfer commands may correspond to one of the areas used to perform the data transfer. After dividing the host command into multiple data transfer commands, the individual data transfer commands may be stored in the queue channels corresponding to the areas used to perform the data transfer. Alternatively, if the host controller 116 determines that the received host command involves a data transfer only using a single area, then the host controller 116 may store the host command in a corresponding queue channel without first dividing the command.

As an illustration, the host controller 116 may receive a read host command from the host 106. In response to receipt of the host command, the host controller 116 may identify base address information in the read host command, which may identify a base address at which data stored in the data storage 104 is to be transferred to the host 106 to execute the read host command. From the base address, the host controller 116 may identify one of the areas 108-114—such as the second area 110—as an initial area from which the data is to be read.

In addition to determining the second area 110 as the initial area, the host controller 116 may also determine whether data is to be read from areas other than the second area 110 to complete execution of the host command. In other words, if some of the data requested in the read host command is stored in areas other than the second area 110, then the other areas in addition to the second area 110 may be accessed to complete execution of the read host command. For some example configurations, this determination may be based on a size of the data to be transferred indicated in the host command. For example, if the size of the data identified in the read host command exceeds a size of the second area 110, then the host controller 116 may determine the areas other than the second area 110, such as the first area 108, the third area 112, and/or the fourth area 114, that are to be accessed in order to transfer all of the data requested in the read host command to the host 106. For some example configurations, the determination may be based on a pattern, such as an interleaving pattern. For example, if the host controller 116 determines that the data is to be accessed from three areas to execute the read host command and the initial area is the second area 110, then based on the pattern, the host controller 116 may determine that the second area 110, the third area 112, and the fourth area 114 are to be accessed to execute the read host command. Alternatively, if the host controller 116 determines that all of the data requested in the read host command is stored in the second area 110, then the host controller 116 may determine that no other areas may be accessed to complete execution of the read host command.

If the host controller 116 determines that multiple areas, such as the second area 110, the third area 112, and the fourth area 114, are to be accessed to execute the read host command, then the host controller 116 may divide the read host command into three data transfer commands, each corresponding to and including a command to access data from one of the second, third, and fourth areas 110, 112, 114 to complete execution of the host read command. The host controller 116 may then store each of the three data transfer commands in one of the second, third, and fourth queue channels 122, 124, 126 associated with the second, third, and fourth areas 110, 112, 114, respectively.

As shown in FIG. 1, each of the queue channels 120-126 may include a tail or tail portion and a head or head portion. The host controller 116 may be configured to store or "push" data transfer commands into the tails of the queue channels 120-126. Alternatively, data transfer commands may be selected for execution when they are at the heads of the queue channels 120-126. If there are no data transfer commands in a queue channel, then the queue channel may be empty. When the host controller 116 pushes an initial data transfer command into an empty queue channel, the data transfer command may be positioned at both the tail and head portions of the queue channel. Subsequently, when the host controller 116 pushes a second data transfer command into the tail of the queue channel, then the second data transfer command may be positioned at the tail of the queue channel and the first data transfer may be at the head of the queue channel. If the host controller 116 pushes a third data transfer command into the tail of the queue channel, then the third data transfer command may be positioned at the tail of the queue channel, the first data transfer command may be positioned at the head of the queue channel, and second data transfer command may be positioned in between the head and tail of the queue channel.

In addition, after a data transfer command at the head of the queue is selected for execution, a next data transfer command may then move or be positioned at the head of the queue channel. Using the example above, after the first data transfer command is selected for execution, the second data transfer command may move to the head of the queue channel.

The data storage controller 118 may be configured to select and/or identify data transfer commands located at the heads of the queue channels 120-126 for execution. In the example configuration of the storage controller system 102 shown in FIG. 1, when the data storage controller 118 selects a data transfer command from the head of one of the queue channels 120-126, the data identified in the data transfer command may be transferred and any data to be sent to the host 106 in response the data transfer command is communicated to the host controller 116. In turn, the host controller 116 may send the data to the host 106. For example, if the data transfer command is a read data transfer command, then upon selection of the read data transfer command from the head of a queue channel, the data storage controller 118 may access the associated area of the data storage 104 to read or obtain the data identified in the read data transfer command, and send the obtained data to the host controller 116, which may send the obtained data back to the host 106. Alternatively, if the data transfer command is a write data transfer command, then upon selection of the write data transfer command from the head of a queue channel, the data storage controller 118 may write data identified or included in the write data transfer command to the associated area of the data storage 104.

For some example configurations, execution of all data transfer commands associated with a host command at the same time or substantially the same time may be desirable to achieve optimum performance. Conversely, execution of only some of the data transfer commands (or less than all of the data transfer commands) making up a host command while other data transfer commands remain pending in the queue system may be undesirable. For example, if a read host command is divided into three read data transfer commands, optimum or enhanced performance may be achieved by executing all three of the data transfer commands and sending all of the data back to the host 106 together and/or at substantially the same time.

So that all data transfer commands may be selected for execution together or at substantially the same time, the data storage controller 118 may be configured to select data transfer commands at the heads of the queue channels 120-126 for execution only if all of the data transfer commands associated with a host command are positioned at the heads of their associated queue channels and/or if none of the data transfer commands associated with the host command are being blocked by a data transfer commands associated with a different host command. Conversely, if less than all of the data transfer commands associated with a host command are positioned at the heads of their associated queue channels or at least one of the data transfer commands is blocked by a data transfer command associated with a different host command, then the data storage controller 118 may not select or withhold from selection those data transfer commands for execution. A first data transfer command in a queue channel may block a second data transfer command if the first and second data transfer commands are positioned in the queue channel relative to each other such that the first data transfer command would be located at the head of queue channel and selected for execution before the second data transfer command.

Figure 2A:
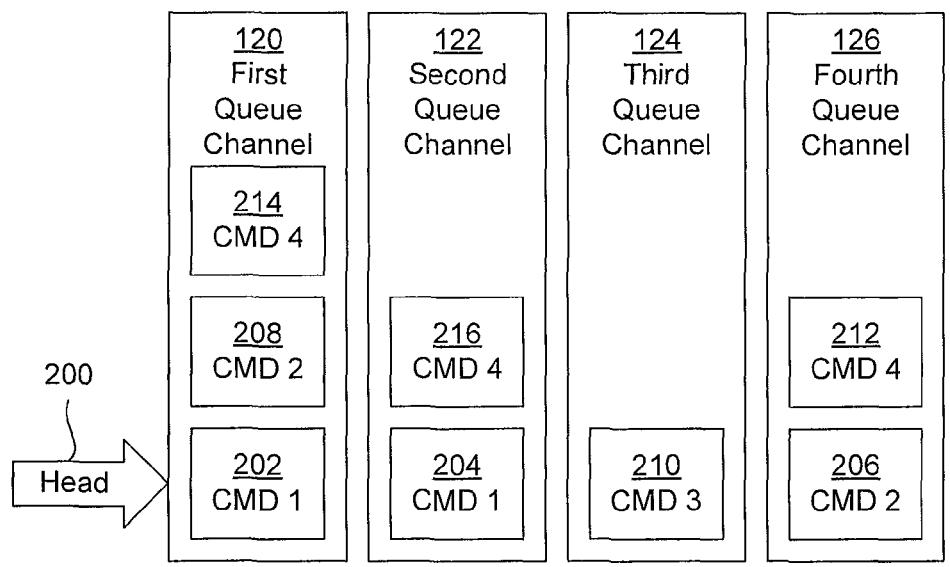
FIG. 2A is a block diagram of data transfer commands stored in a plurality of queue channels of the storage controller system of FIG. 1 at a first time.
Figure 2B:
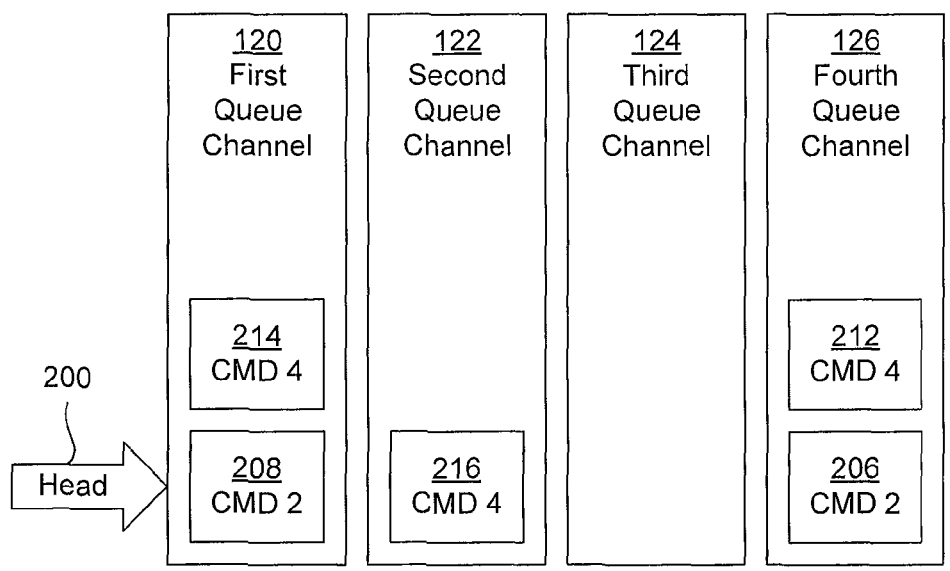
FIG. 2B is a block diagram of data transfer commands stored in the plurality of queue channels shown in FIG. 2A at a second time.
Figure 2C:
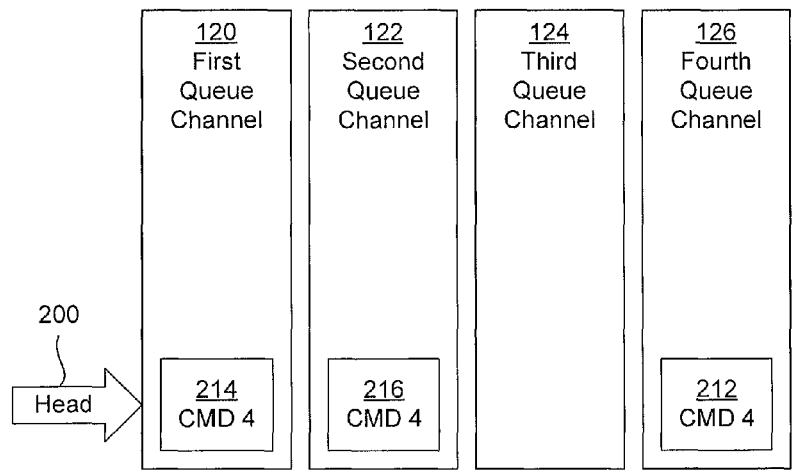
FIG. 2C is a block diagram of data transfer commands stored in the plurality of queue channels shown in FIG. 2A at a third time.

FIGS. 2A-2C show block diagrams of the queue channels 120-126 in various states at various times or instances when a plurality of data transfer commands associated with multiple host commands are being stored and selected from the queue channels 120-126, illustrating the selection process that the data storage controller 118 may use to select the data transfer commands for execution at the various instances. FIG. 2A shows an initial time or instance, at which an initial example configuration of the data transfer commands are stored in the queue channels 120-126.

In further detail of the initial example configuration shown in FIG. 2A, the host controller 116 may have divided a received first host command CMD 1 into two data transfer commands 202, 204, and stored data transfer command 202 in the first queue channel 120 and data transfer command 204 in the second queue channel 122. In addition, the host controller 116 may have divided a second received host command CMD 2 into two data transfer commands 206, 208, and stored data transfer command 206 in the fourth queue channel 126 and stored data transfer command 208 in the first queue channel 120. Also, upon receipt of a third host command CMD 3, the host controller 116 may have determined not to divide the third host command CMD 3, and stored a single data transfer commands 210 in the third queue channel 124. Further, the host controller 116 may have divided a fourth received host command CMD 4 into three data transfer commands 212, 214, 216, and stored data transfer command 212 in the fourth queue channel 126, stored data transfer command 214 in the first queue channel 120, and stored data transfer command 216 in the second queue channel 122. In addition, at the initial instance, data transfer commands 202, 204, 210, and 206 are positioned at the heads of the queue channels 120-126, respectively.

At the first instance, the data storage controller 118 may select data transfer commands 202 and 204 for execution because all of the commands associated with first host command CMD 1 (i.e., data transfer commands 202 and 204) are at the heads of their respective queue channels 120, 122. In addition, at the first instance, the data storage controller 118 may also select data transfer command 210 for execution because the single data transfer command 210 associated with the third host command CMD 3 is at the head of the third queue 124. However, data transfer command 206 may not be selected by the data storage controller 118 at the first instance because the other data transfer command 208 associated with the second host command CMD 2 is not at the head of the first queue channel 120 and blocked by data transfer command 202.

FIG. 2B shows a second instance after data transfer commands 202, 204 associated with the first host command CMD 1 and data transfer command 210 associated with the third host command CMD 3 were selected by the data storage controller 118. As shown in FIG. 2B, after these data transfer commands were selected, data transfer commands 208 and 216 may move to the heads of the queue channels 120 and 122, respectively. At the second instance, the data storage controller 118 may select data transfer commands 206 and 208 associated with the second host command CMD 2 for execution because all of the data transfer commands associated with the second host command CMD 2 (i.e., data transfer commands 206 and 208) are at the heads of the queue channels. However, the data storage controller 118 may withhold selection of the data transfer command 216 despite data transfer command 216 being at the head of the second queue channel 122 because the other data transfer commands associated with the fourth host command CMD 4 (i.e., data transfer commands 214 and 216) are not at the heads of their respective queue channels 126, 120 and are being blocked by data transfer commands 206 and 208 associated with the second host command CMD 2 (i.e., a different host command). As shown in FIG. 2C, after these data transfer commands were selected, data transfer commands 208 and 216 may move to the heads of the queue channels 120 and 122, respectively.

FIG. 2C shows a third instance after data transfer commands 206 and 208 associated with the second host command CMD 2 are selected for execution. As shown in FIG. 2C, after these data transfer commands were selected, data transfer commands 212 and 214 may move to the heads of the queue channels 126 and 120, respectively. At the third instance, the data storage controller 118 may select data transfer commands 212, 214, and 216 for execution because all of the commands associated with the fourth host command CMD (i.e., data transfer commands 212, 214, and 216) are at the heads of the queue channels.

The data storage controller 118 may be configured to use selection information in order to determine when to select and not select for execution a data transfer command located at a head of a queue channel. In particular, the selection information may be used by the data storage controller 118 to determine when all of the data transfer commands associated with a host command are located at heads of the queue channels or are not being blocked by a data transfer command associated with a different host command. The data storage controller 118 may be configured to identify the data transfer command located at the head of each of the queue channels 120-126 and determine the host command with which each of the data transfer commands at the heads may be associated. The data storage controller 118 may then compare that information with the selection information and determine whether all of the data transfer commands associated with a host command are located at the heads of the queue channels 120-126 and/or unblocked.

For some example configurations, the selection information may be configured or arranged as bitmaps. In particular, each received host command may have an associated bitmap. The bitmap may include one or more bits, where each bit in the bitmap may map or correspond to one of the queue channels 120-126. In addition, each bit may have a value, such as a logic "1" or "0" that indicates whether the corresponding queue channel stores a data transfer command associated with the host command.

Figure 3:
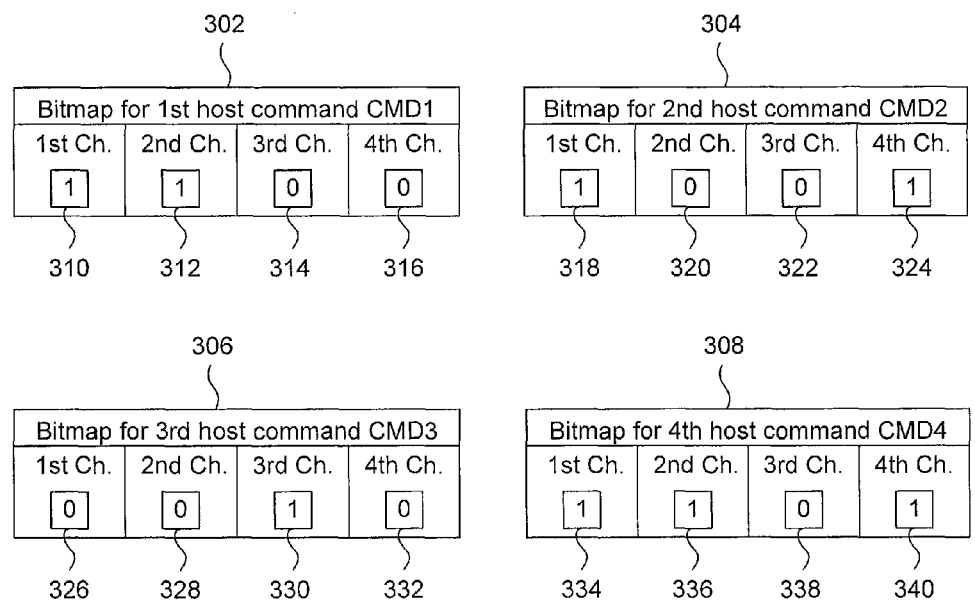
FIG. 3 is a schematic diagram of example bitmaps for received host commands.

FIG. 3 shows schematic diagrams of example bitmaps 302-308 that may be associated with four received host commands. Using the example previously described with reference to FIGS. 2A-2C, a first bitmap 302 may be associated with the first host command CMD 1, a second bitmap 304 may be associated with the second host command CMD 2, a third bitmap 306 may be associated with the third host command CMD 3, and a fourth bitmap 308 may be associated with the fourth host command CMD 4. Each of the bitmaps 302-308 may include four bits, with each bit corresponding to one of the queue channels 120-126 and indicating whether a data transfer command is stored in the corresponding queue channel.

For example, as previously described, the first host command CMD 1 was divided into two data transfer commands, with data transfer command 202 being stored in the first queue channel 120 and data transfer command 204 being stored in the second queue channel 122. Accordingly, the first bitmap 302 may include a first bit 310 having a logic "1" to indicate data transfer command 202 being stored in the first queue channel 120 and a second bit 312 also having a logic "1" to indicate data transfer command 204 being stored in the second queue channel 122. In addition, because no data transfer commands associated with the first host command CMD 1 were stored in the third queue channel 124 or the fourth queue channel 126, then the first bitmap 304 may include a third bit 314 and a fourth bit 316 each having a logic "0" to indicate that no data transfer commands associated with the first host command CMD 1 are stored in the third and fourth queue channels 124, 126.

Similar bitmaps may be generated for the second host command CMD 2, the third host command CMD 3, and the fourth host command CMD 4. The bitmap 304 for the second host command CMD 2 may include a first bit 318 having a logic "1" to indicate that data transfer command 208 is stored in the first queue channel 120, second and third bits 320, 322 each having a logic "0" to indicate that no data transfer commands associated with the second host command CMD 2 are stored in the second and third queue channels 122, 124, and a fourth bit 324 having a logic "1" to indicate that data transfer command 206 is stored in the fourth queue channel 126. The third bitmap 306 may include a first bit 326 having a logic "0" to indicate that the first queue channel 120 does not store a data transfer command associated with the third host command CMD 3, a second bit 328 having a logic "0" to indicate that the second queue channel 122 does not store a data transfer command associated with the third host command CMD 3, a third bit 330 having a logic "1" to indicate that the third queue channel 124 stores data transfer command 210, and a fourth bit 332 having a logic "0" to indicate that the fourth queue channel 126 does not store data transfer commands associated with the third host command CMD 3. The fourth bitmap 308 may include a first bit 334 having a logic "1" to indicate that data transfer command 214 is stored in the first queue channel 120, a second bit 336 having a logic "1" to indicate that data transfer command 216 is stored in the second queue channel 122, a third bit 338 to indicate that third queue channel 224 does not store data transfer command associated with the fourth host command CMD 4, and a fourth bit 340 to indicate that data transfer command 212 is stored in the fourth queue channel 126.

In alternative example configurations, the logic values of the bits in the bitmaps may be reversed. That is, logic "0" may be used to indicate the presence and logic "1" may be used to indicate the absence of a data transfer command in a queue channel. In still other alternative example configurations, the selection information may be formatted using configuration other than bitmaps and/or may use values other than bits having binary logic values to indicate the presence and absence of data transfer commands in the queue channels 120-126. Various configurations may be possible.

Referring back to FIG. 1, the host controller 116 may be configured to generate selection information upon receipt of a host command. For example, the host controller 116 may be configured to receive a host command, determine which of the queues 120-126 in which to store data transfer commands associated with the host command, and then generate corresponding selection information identifying which of the queue channels 120-126 are storing the data transfer commands. The host controller 116 may then provide or send the selection information to the data storage controller 118, which the data storage controller 118 may use to determine whether to select for execution a data transfer command at a head of a queue channel. In addition or alternatively, the host controller 116 may store the selection information in a bitmap portion 130 of the memory 128, which the data storage controller 118 may access or retrieve to perform the selection.

As previously described, when the data storage controller 118 selects a data transfer command for execution, the selected data transfer command may be executed on the associated area of the data storage, and any data to be sent to the host 106 in response to execution of the data transfer command may be sent from the data controller 118 to the host controller 116, which in turn may send the data to the host 106. In addition, as previously described, it may be desirable to send all of the data being requested from the host 106 together or at substantially the same time. As such, the data storage controller 118 may be configured to withhold from selecting a data transfer command at the head of a queue channel if all of the data transfer commands associated with a host command are not at the heads of the queue channels.

However, in some situations, a determination by the data storage controller 118 to withhold selection of a data transfer command at a head of a queue may yield less than optimum performance due to a data operation on an associated area 108-114 of the data storage 104 not being performed despite their being a pending data transfer command in the queue channels 120-126. To improve performance or achieve optimum performance, selection and execution of data transfer commands at the heads of the queue channels 120-126 whenever possible may be desirable.

Figure 4:
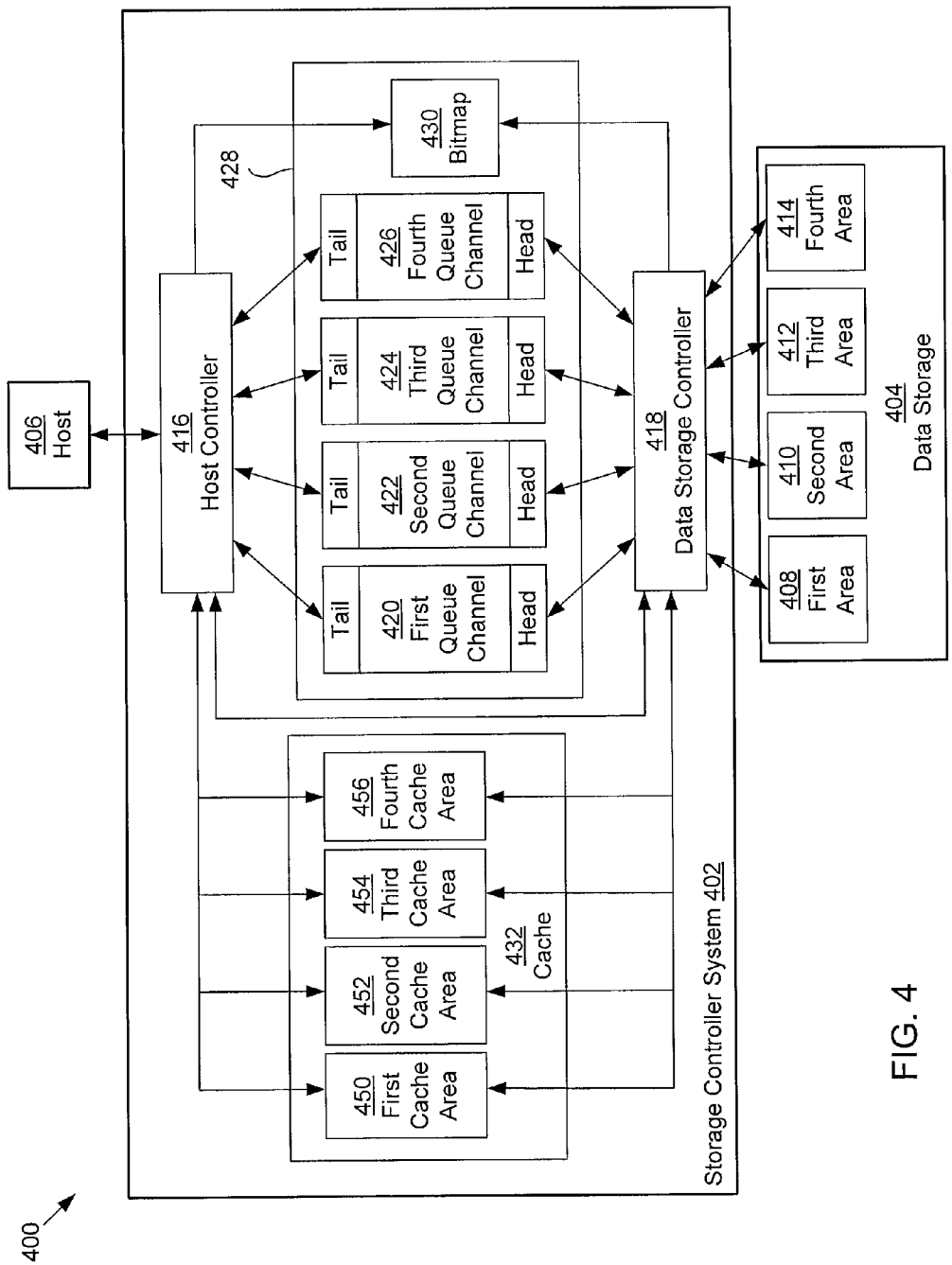
FIG. 4 is a block diagram of an alternative storage controller system that executes data transfer commands in response to received host commands.

FIG. 4 shows a system 400 including an alternative storage controller system 402 that utilizes or includes temporary storage or cache 432 to temporarily store or cache data that may be accessed from areas 408-414 of data storage 404 and that may be sent to a host 406 in response to execution of data transfer commands. A host controller 416 may be configured to receive, parse, and queue host commands received from a host 406 and generate selection information, similar to the host controller 116. However, a data storage controller 418 may be configured to select data transfer commands at heads of queue channels 420-426 differently. In particular, the data storage controller 418 may be configured to select a data transfer command at a head of a queue channel in response to an ability of the data storage controller 418 to perform a data transfer operation on an associated area 408-414 of the data storage 404. For example, if the data storage controller 418 selects a write data transfer command from the fourth queue 426 and writes data to the fourth area 414 to execute the write data transfer command, the data storage controller 418 may not select another data transfer command from the fourth queue channel 426 unless or until the data storage controller 418 has the ability or resources to perform another data transfer operation on the fourth area 414. In addition, or alternatively, the data storage controller 418 may be configured to select a data transfer command at a head of a queue channel in response to a determination that a corresponding cache area of the cache 432 is available to receive data to be sent to the host 406 upon execution of the data transfer command.

In further detail, the cache 432 may include a plurality of cache areas 450-456. Each of the cache areas 450-456 may correspond to one of the data storage areas 408-414 and associated or corresponding queue channels 420-426. If, upon execution of a data transfer command on a data storage area, data is to be obtained from the data storage area and sent back to the host 406, the data may be stored in a cache area associated with the data storage area before being sent to the host 406. To illustrate, if a read data transfer command is positioned at the head of the first queue channel 420, upon selection and execution of the read data transfer command, the data storage controller 418 may read data from the first data storage area 408 and send the data to a first cache area 450, which may correspond to and/or be associated with the first data storage area 408 and the first queue channel 420.

When the data storage controller 418 identifies a data transfer command at a head of a queue, the data storage controller 418 may be configured to determine whether an associated cache area is available to receive and store the data to be read from the associated area upon execution of the data transfer command. For example, if the data storage controller 418 identifies a read data transfer command at the head of the first queue channel 420, before selecting the read data transfer command for execution, the data storage controller 418 may determine whether the associated first cache area 450 is empty or has enough available space to receive and/or store the data to be read from the associated first storage area 408 upon execution of the read data transfer command. If the first cache area 450 is available to receive and store the data, then the data storage controller 418 may select and execute the read data transfer command. Alternatively, if the first cache area 450 is not available to receive and store the data, then the data storage controller 418 may leave the read data transfer command pending at the head of the first queue channel 420.

The host controller 416 may be configured to retrieve the data cached in the cache areas 450-456 and send the data to the host 406. The host controller 416 may determine whether to retrieve the data stored in a particular cache area or leave the data pending in the cache area. In particular, the host controller 416 may determine to retrieve data stored in a cache area if all of the data to be sent to the host 406 in response to a host command is stored in the cache areas 450-456. Conversely, if all of the data to be sent to the host 406 in response to a host command is not stored in the cache areas 450-456, then the host controller 406 may determine to leave any data to be sent to the host to respond to the host command pending in the cache areas 450-456. In this way, the host controller 416 may send all of the data requested from a read host command together or at substantially the same time to the host 406, even if the data storage controller 418 is selecting and executing different data transfer commands associated with the read host command at different times or instances.

To illustrate, the host controller 416 may receive a host command for retrieval of data that includes first data stored in the first data storage area 408 and second data stored in the second data storage area 410. After queuing a first data transfer command in the first queue channel 420 and a second data transfer command in the second queue channel 422, the host controller 416 may identify that the first data is being cached in the associated first cache area 450 and/or the second data is being cached in the associated second cache area 452. If both the first data is being cached in the first cache area 450 and the second data is being cached in the second cache area 452, then all of the data to be sent to the host 406 to respond to the host command is being cached. Accordingly, the host controller 416 may retrieve the first data from the first cache area 450 and the second data from the second cache area 452 and send the first and second data to the host 406. Conversely, if, for example, the first data is being cached in the first cache area 450 but the second data is not being cached in the second cache area 452, then less than all of the data to be sent to the host 406 to respond to the host command is being cached. Accordingly, the host controller 416 may not retrieve the first data being cached in the first area 450.

In order to determine whether to retrieve data being cached in the cache areas 450-456, the host controller 416 may use selection information, which may indicate when all of the data to be sent to the host 406 in response to a host command is being cached in the cache areas 450-456. In some example configurations, the selection information may be similar to and/or include the same or similar information as the selection information generated by the host controller 116. For example, the selection information may include bitmaps that include bits having values that indicate which of the cache areas are to cache data in order for all data being sent in response to a host command to be cached. For some example configurations, the selection information may identify the queue channels 420-426 in which data transfer commands associated with a host command are stored. From this selection information, the host controller 416 may derive or determine which of the associated cache areas are to cache the data. Alternatively, the selection information may expressly indicate the cache areas that are to cache data without indicating the queue channels storing data transfer commands.

In addition, for each cache area 450-456, if data is being cached in a cache area, the host controller 416 may be configured to identify the host command for which the data is being cached. The host controller 416 may then be configured to compare the identified host commands with the selection information to determine, for a given host command, whether all of the data to be sent to respond to the host command is being cached in the cache areas 450-456.

In some example configurations, the host controller 416 may generate selection information only for those host commands in which a response back to the host 406 is to be performed. For example, selection information may be generated for read host commands, but not for write host commands. Alternatively, if a write host command requires a response, such as an acknowledgement that the write host command was executed or performed, then the host controller 416 may generate selection information and the data storage controller 418 may cache the response information in the cache areas 450-456.

FIGS. 5A-5F show block diagrams of the queue channels 420-426 in various states at various times or instances when data transfer commands are being stored in and selected from the queue channels 420-426. FIGS. 5A-5F also show block diagrams of the cache areas 450-456 in various states at various times or instances, when data accessed from the data transfer commands are being cached in and retrieved from the cache areas 450-456, illustrating the selection processes that the host controller 416 and the data storage controller 418 may perform to select the data transfer commands and retrieve the cached data to send to the host 406. The example data transfer commands 202-216 used for and described with reference to FIGS. 2A-2C are now used and described for the queue channels 420-420 shown in FIGS. 5A-5F.

Figure 5A:
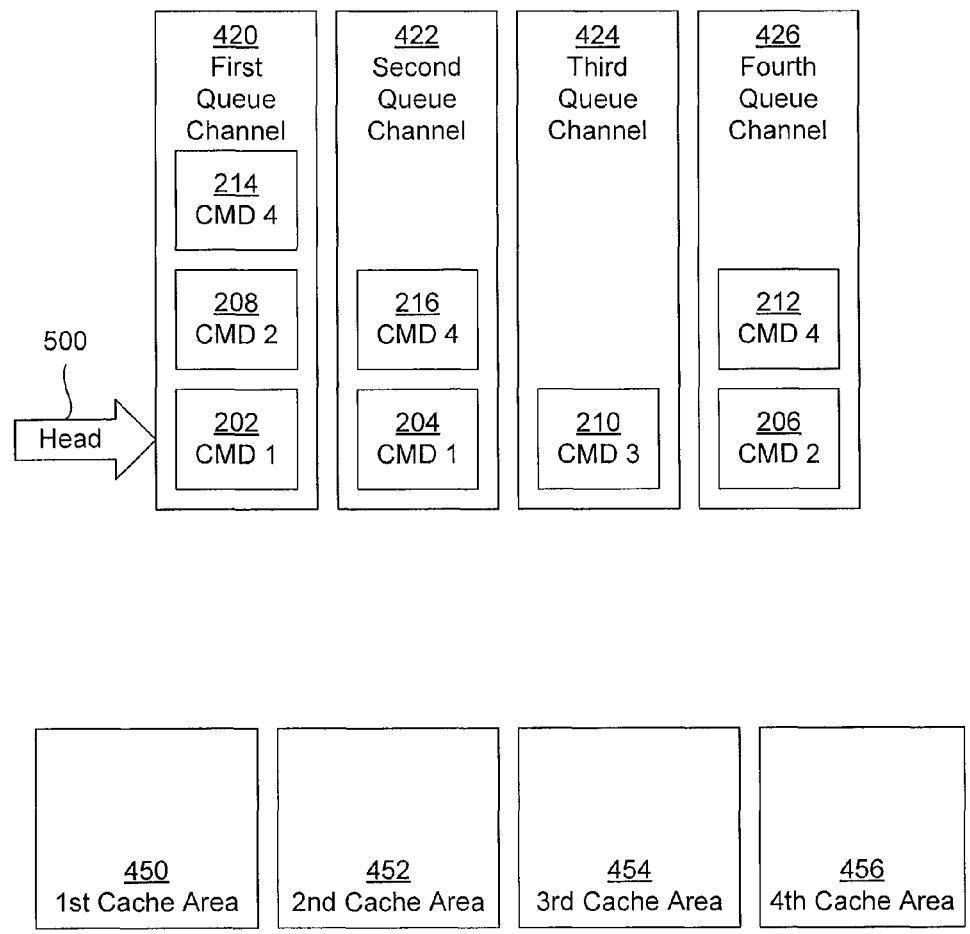
FIG. 5A is a block diagram of data transfer commands stored in a plurality of queue channels of the alternative storage controller system of FIG. 4 and associated cache areas at a first time.

FIG. 5A shows the data transfer commands 202-216 being stored in the queue channels 420-426 in the same initial example configuration in which the data transfer commands 202-216 were stored in the queue channels 120-126. When storing the transfer commands 202-216, the host controller 416 may generate selection information, such as the bitmaps 302-308 shown in FIG. 3. The host controller 416 may store the selection information in a bitmap storage area 430 (FIG. 4) for later access and/or for access by the data storage controller 418. In addition, as shown in FIG. 5A, at the first instance, all of the cache areas 450-456 may be empty and thus available to receive data. From the state of the cache areas 450-456 at the first instance, the data storage controller 418 may identify that each of the cache areas 450-456 are available to receive data, and in response, may select for execution data transfer commands 202, 204, 210, and 206 from the heads (identified by head marker 500) of the queue channels 420-426, respectively.

Figure 5B:
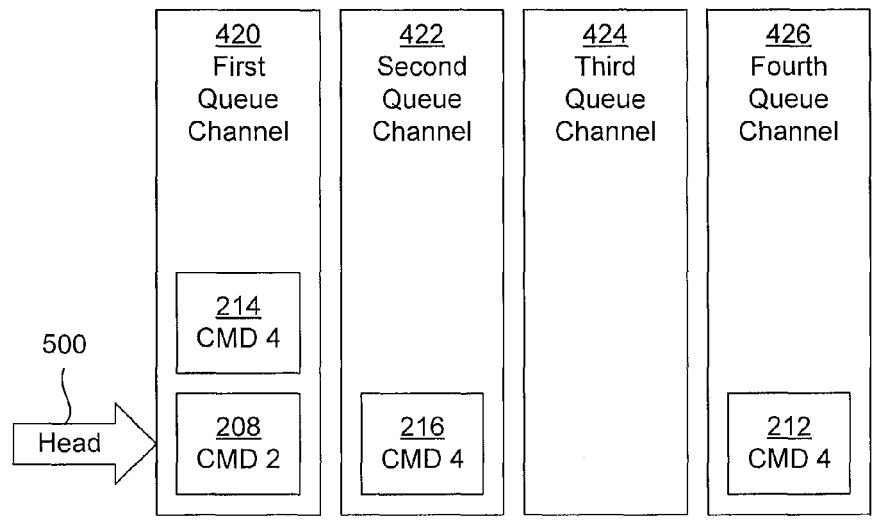
FIG. 5B is a block diagram of data transfer commands stored in the plurality of queue channels and associated cache areas at a second time.
Figure 5B:
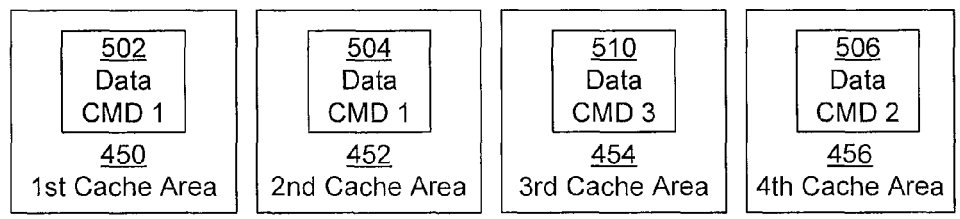

FIG. 5B shows the state of the queue channels 420-426 and cache areas 450-456 at a second instance after the data transfer commands 202, 204, 210, and 206 are selected and executed. Data transfer command 208 associated with the second host command CMD 2 and data transfer commands 216 and 212 associated with the fourth host command CMD 4 may move to the heads of the queue channels 420, 422, and 426, respectively. In addition, data 502 accessed from the first storage area 408 in response to execution of data transfer command 202 may be cached in the first cache area 450. Similarly, data 504 accessed in response to execution of data transfer command 204 may be cached in the second cache area 452, data 510 accessed in response to execution of data transfer command 210 may be cached in the third cache area 454, and data 506 accessed in response to execution of data transfer command 206 may be cached in the fourth cache area 456.

The host controller 416 may be configured to analyze the cache 432 and identify the data in the cache areas 450-456. The host controller 416 may also identify the host commands with which the data may be associated. The host controller 416 may then compare that information with the selection information to determine whether to retrieve any of the data in the cache areas 450-456 and send the retrieved data to the host 406.

In response to the data 502, 504, 510, and 506 being stored in the cache areas 450-456 at the second instance, the host controller 416 may identify that data 502 and 504 accessed for the first host command CMD 1 are being stored in the first and second cache areas 450 and 452, respectively. The host controller 416 may then compare that information with the selection information, such as the bitmap 302 (FIG. 3) associated with the first host command CMD 1. For example, the host controller 416 may identify that the bits 310 and 312 have logic "1" and the bits 314 and 316 have logic "0" and compare that information with its analysis that the first and second queue areas 450 and 452 are storing data 502, 504 for the first host command CMD 1. In response, the host controller 416 may determine that all of the data to be sent to the host 406 in response to execution of the first host command CMD 1 is being stored in the cache 432. In turn, the host controller 416 may retrieve the data 502, 504 stored in the first and second cache areas 450, 452 and send the data 502, 504 to the host 406 together and/or substantially at the same time.

A similar analysis and comparison of the data 510 stored in the third cache area 454 and the data 506 stored in the fourth cache area 456 may be performed by the host controller 416. For example, the host controller 416 may analyze the bit map 306 associated with the third host command CMD 3, and in response determine to retrieve the data 510 from the third cache area 454 and send the data 510 to the host 406. The host controller 416 may also analyze the bit map 304 associated with the second host command CMD 2, and in response determine not to retrieve the data 506 from the fourth cache area 456 because, based on the values of the bits 318-324, all of the data for the second host command CMD 2 is being cached when data for the second host command CMD 2 is in both the first cache area 450 and the fourth cache area 456. Because, at the second instance, data for the second host command CMD 2 is in the fourth cache area 456 but not in the first cache area 450, the host controller 416 may determine to withhold retrieval of the data 506.

Figure 5C:
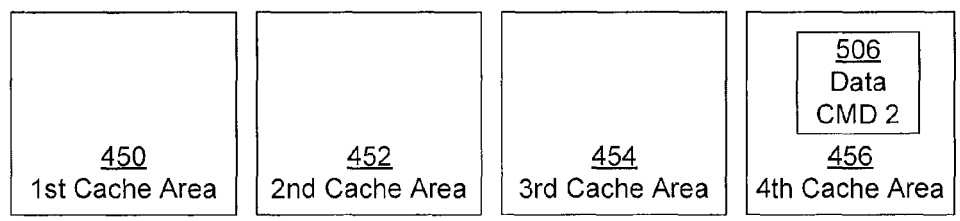
FIG. 5C is a block diagram of the associated cache areas at a third time.

FIG. 5C shows a state of the cache areas 450-456 at a third instance after the host controller 416 retrieves the data 502, 504, and 510 from the first, second, and third cache areas 450-454, respectively. Following the retrieval, the data storage controller 418 may determine that the first, second, and third cache areas 450-454 are empty, and thus available to receive data. In response to determining that the first, second, and third cache areas 450-454 are available, the data storage controller 418 may be configured to select data transfer commands 208 and 216 at the heads of the associated first and second queues 420, 422 for execution.

Figure 5D:
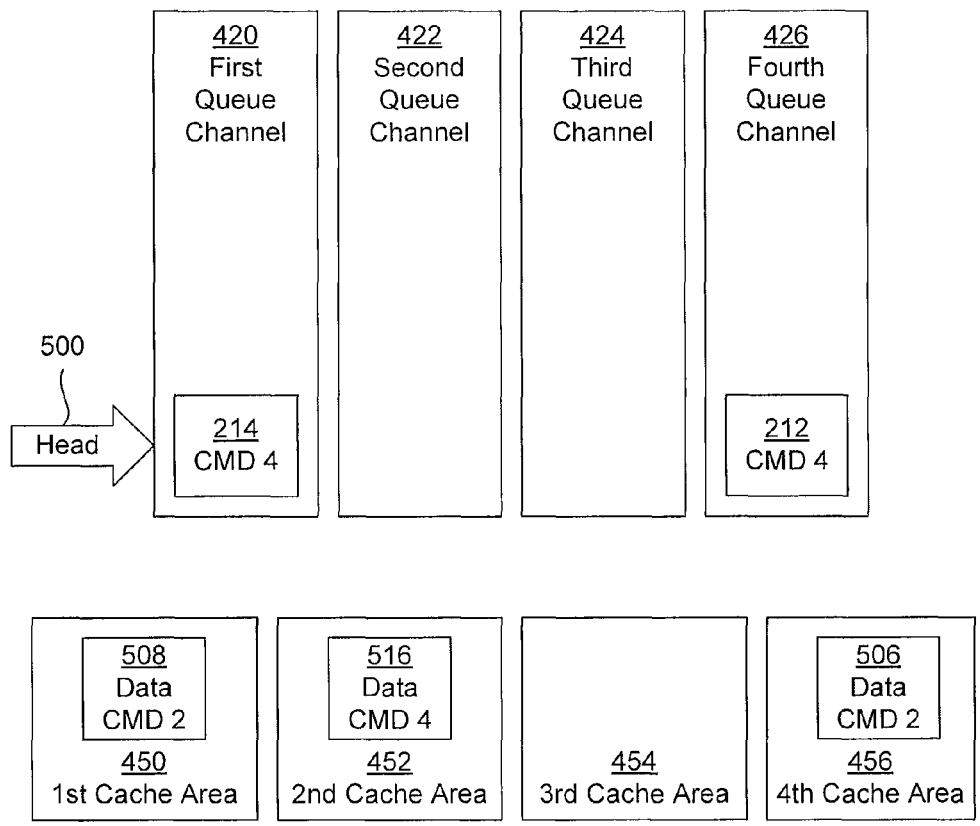
FIG. 5D is a block diagram of data transfer commands stored in the plurality of queue channels and associated cache areas at a fourth time.

FIG. 5D shows the queue channels 420-426 and cache areas 450-456 at a fourth instance after the data transfer commands 208 and 216 are selected and executed. In response, data transfer command 214 may move to the head of the first queue channel 420. In addition, the data 508 accessed in response to execution of data transfer command 208 may be cached in the first cache area 450 and data 516 accessed in response to execution of data transfer 216 may be cached in the second cache area 452, as shown in FIG. 5D.

After the data 508 is cached in the first cache area 450, the host controller 416 may then identify that data for the second host command CMD 2 is now being stored in both the fourth cache area 456 and the first cache area 450 and determine, based on its analysis of the second bit map 304, that all of the data for the second host command CMD 2 is now being cached. In response, the host controller 416 may retrieve the data 508 and the data 506 from the first and fourth cache areas 450, 456 and send the data 508 and 506 to the host 406 together and/or at substantially the same time. However, based on its analysis of the fourth bitmap 308, the host controller 416 may determine to withhold retrieval of the data 516 stored in the second cache area 452 at the fourth instance.

Figure 5E:
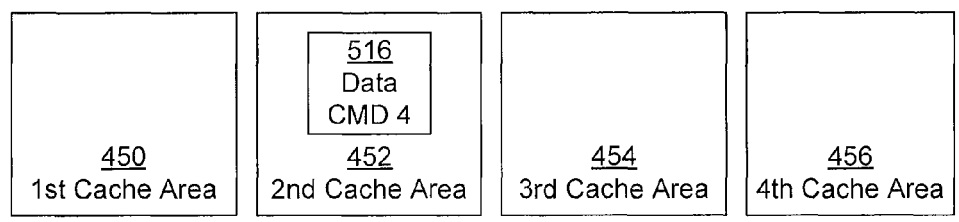
FIG. 5E is a block diagram of the plurality of cache areas at a fifth time.

FIG. 5E shows a state of the cache areas 450-456 at a fifth instance after the host controller 416 retrieves the data 508 and 506 from the first and fourth cache areas 450, 456, respectively. Following the retrieval, the data storage controller 418 may determine that the first, third, and fourth cache areas 450, 454, and 456 are empty, and thus available to receive data. In response, the data storage controller 418 may be configured to select data transfer commands 214 and 212 at the heads of the associated first and fourth queues 420, 426 for execution.

Figure 5F:
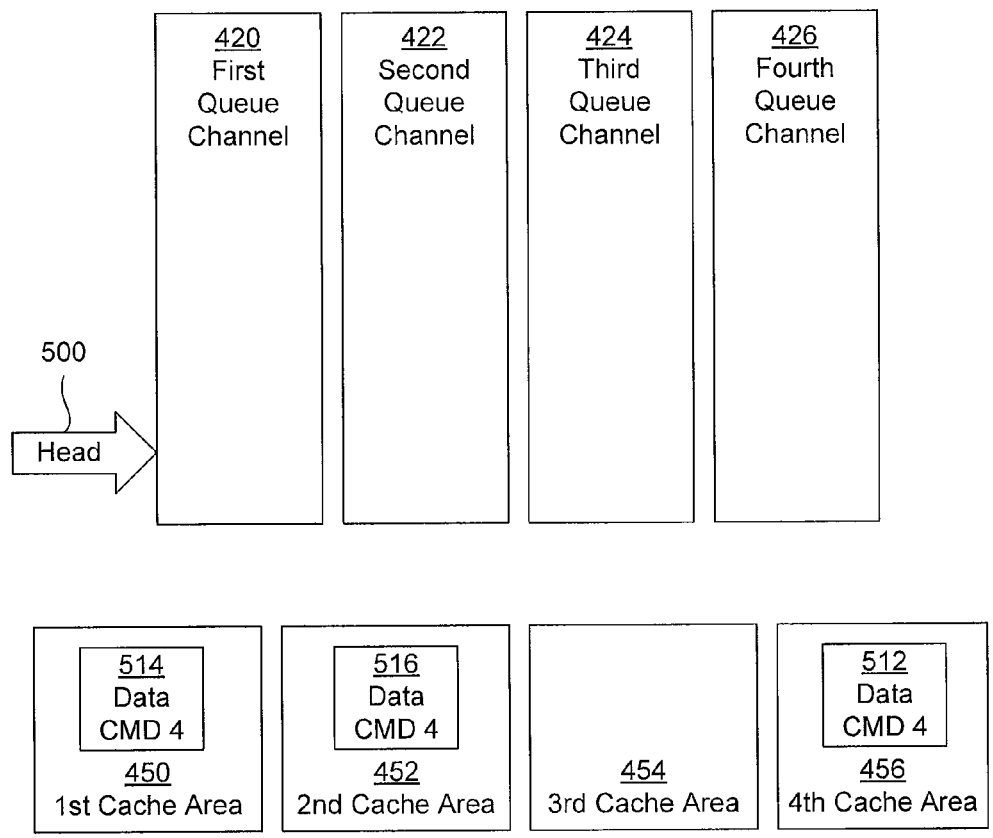
FIG. 5F is a block diagram of data transfer commands stored in the plurality of queue channels and associated cache areas at a sixth time.

FIG. 5F shows the queue channels 420-426 and cache areas 450-456 at a sixth instance after the data transfer commands 212 and 214 are selected and executed. In response, the queue channels 420-426 may be empty, assuming that no further host commands are received and queued. In addition, data 514 and 512 accessed in response to execution of data transfer commands 214 and 212 may be cached in the first and fourth cache areas 450, 456, respectively, as shown in FIG. 5F. Thereafter, based on an analysis of the fourth bitmap 308, the host controller 416 may determine that all of the data for the fourth host command CMD 4 is being cached. In response, the host controller 416 may retrieve the data 512, 514, and 516 from the fourth, first, and second cache areas 456, 450, 452, respectively, and send all of the data 512, 514, 516 for the fourth host command CMD 4 to the host 406 together and/or substantially at the same time.

Referring to FIGS. 1 and 4, the one or more controllers of the storage controller systems 102 and 402, including the host controllers 116, 416 and the data storage controllers 118, 418, may include or be implemented in hardware, such as hardware logic. In addition, the one or more controllers may include or be a plurality of controllers, a processor, or a plurality of processors, configured to perform various types of processing, such as multi-processing, multi-tasking, parallel processing, remote processing, distributed processing, or the like, to perform the functions and operations of the one or more controllers. Also, the one or more controllers may be configured to execute program instructions that may be part of software, hardware, micro-code, firmware, or the like in order to perform at least some of the function or operations.

The memory 128 and 428 may include one or more various types of memory structures or technologies of volatile memory, non-volatile memory, or combinations thereof, including but not limited to random access memory, read-only memory, programmable read-only memory, electrically programmable read-only memory, electrically erasable read-only memory, flash memory (e.g., NAND, NOR, or other flash memories), magnetic tape or disk, optical media, or other memory technologies. In addition, the memory 128 and 148 may be configured in accordance with any currently existing or later developed memory technologies or configurations, such as flash memory, Trusted Flash, Secure Digital, Hard Drive, or universal serial bus (USB), as non-limiting examples.

In addition, the temporary storage or cache 432 may be implemented using any of the volatile and/or non-volatile memory technologies described above. Also, FIG. 4 shows the cache 432 as a separate component of the storage controller system 420 from the memory 428. Alternatively, the cache 432 may be a component or part of the memory 428.

In some example configurations, the memory 128, 428 may be a computer readable storage media, which may include a non-transitory computer readable storage media, having stored therein data representing instructions executable by the one or more controllers. The memory 128, 428 may store the instructions for the one or more controllers. The functions, acts, methods, or tasks illustrated in the figures or described herein may be performed by the one or more controllers executing the instructions stored in the memory 128, 428.

For some example configurations, the components of the storage controller system 102, 402, including the host controllers 416, data storage controllers 118, 418, memories 128, 428, and/or cache 432 may be implemented or integrated together as an integrated circuit (IC), chip, or microchip, such as a field programmable gate array (FPGA) or an applications specific integrated circuit (ASIC). The IC may be configured to interface and/or communicate with the data storage components 104, 404, and/or the host devices 106, 406 of the systems 100, 400. Alternatively, one or more of the components of the storage controller systems 102, 402 may be integrated on different ICs or chips or using other electronic devices or technologies to make up the controller storage systems 102, 402. Various configurations are possible.

Figure 6:
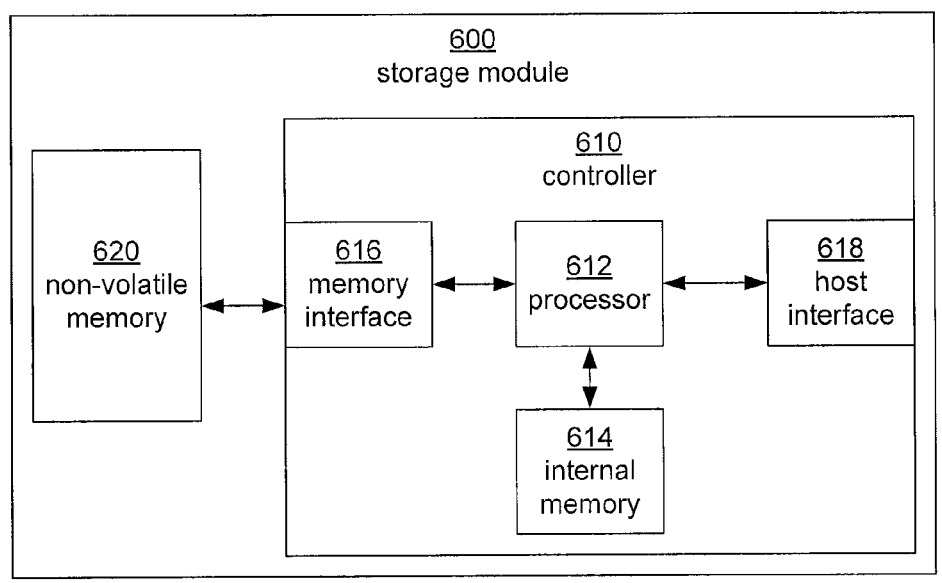
FIG. 6 is a block diagram of a storage module.

In some configurations, the storage controller systems 102, 402 and the data storage 104, 404 shown in FIGS. 1 and 4 may be implemented as a storage module. FIG. 6 shows an example embodiment of a storage module 600. The storage module 600 may include a controller 610 and non-volatile memory 620. The non-volatile memory 620 may be implemented using the data storage 104 or 404. The controller 610 may include a processor 612 that is configured to perform the functions of the host controllers 116, 416 and the data storage controller 118, 418. In addition, the controller 610 may include internal memory 614, which may be separate from the non-volatile memory 620, and which the processor 612 may use to perform one or more functions or operations. For some examples, the internal memory 620 may include the memory 128 or 428, including the queue channels 120-126 or 420-426, the bitmap storage areas 130, 430, and/or the temporary storage or cache 432. Alternatively, one or more of the queue channels 120-126 or 420-426, the bitmap storage areas 130, 420, and/or the temporary storage or cache 432 may be part of the non-volatile memory 620.

Additionally, as shown in FIG. 6, the controller 610 may include a memory interface 616 that interfaces with the non-volatile memory 620. Also, the controller 610 may include a host interface 618 that configures the storage module 600 operatively in communication with a host. As used herein, the phrase "operatively in communication with" could mean directly in communication with or indirectly in communication through one or more components, which may or may not be shown or described herein. The host interface 618 may communicate memory data transfer commands from a host to the controller 610, and also communicate responses from the controller 610 to the host. Additionally, the host interface 618 may take any suitable form, such as, but not limited to, an eMMC host interface, a UFS interface, and a USB interface, as examples.

Figure 7A:
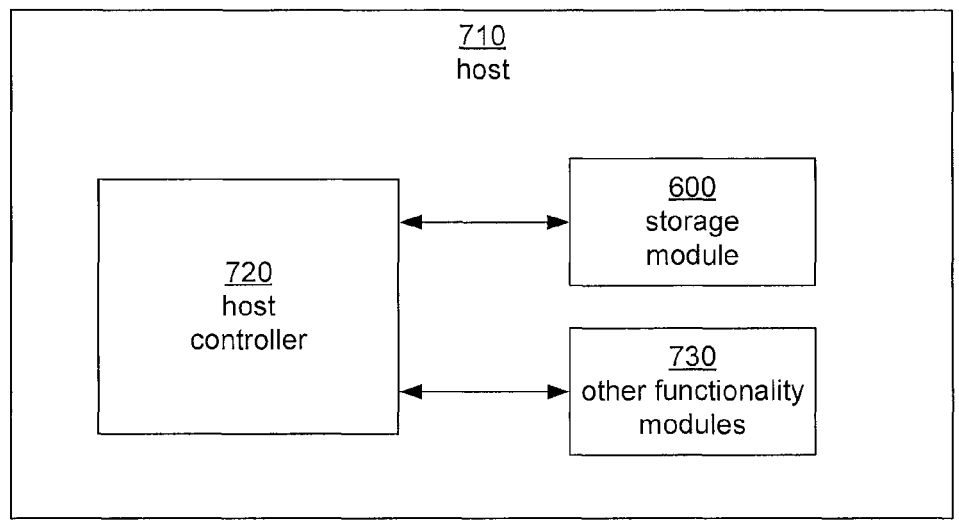
FIG. 7A is a block diagram of the storage module shown in FIG. 6 embedded in a host.
Figure 7B:
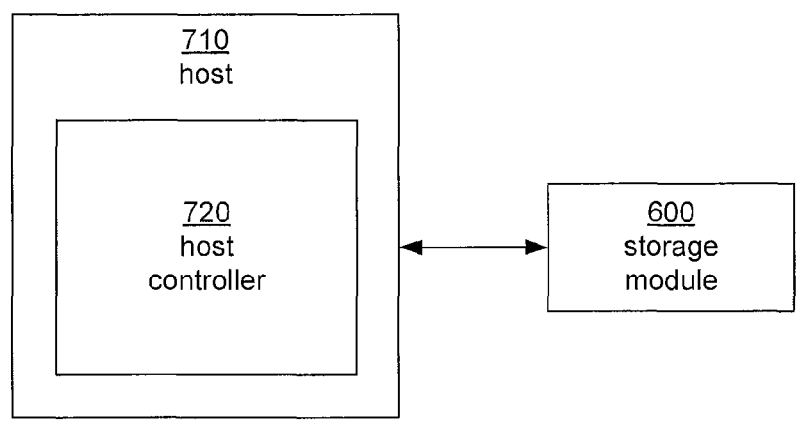
FIG. 7B is a block diagram of a storage module shown in FIG. 6 removably connected with a host.

The storage module 600 may be implemented with a host by being an embedded device of the host or by being removably connected with a host. FIGS. 7A and 7B show these implementations. As shown in FIG. 7A, the storage module 600 shown in FIG. 6 may be embedded in a host 710, which may be representative of the host 106 shown in FIG. 1 or the host 406 shown in FIG. 4. In addition to embedding the storage module 600, the host 710 may have a host controller 720. That is, the host 710 may embody the host controller 720 and the storage module 700, such that the host controller 720 interfaces with the embedded storage module 600 to manage its operations. For example, the storage module 600 can take the form of an iNAND™ eSD/eMMC embedded flash drive by SanDisk Corporation. The host controller 720 may interface with the embedded storage module 600 using the host interface 618. Additionally, when the storage module 600 is embedded in the host 710, some or all of the functions performed by the controller 610 in the storage module 600 may instead be performed by the host controller 720.

The host 710 can take any form, such as, but not limited to, a solid state drive (SSD), a hybrid storage module (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader, as examples. As shown in FIG. 7A, the host 710 can include optional other functionality modules 730. For example, if the host 710 is a mobile phone, the other functionality modules 730 can include hardware and/or software components to make and place telephone calls. As another example, if the host 710 has network connectivity capabilities, the other functionality modules 730 can include a network interface. Of course, these are just some examples, and other implementations can be used. Also, the host 710 can include other components (e.g., an audio output, input-output ports, etc.) that are not shown in FIG. 7A to simplify the drawing.

As shown in FIG. 4B, instead of being an embedded device in a host, the storage module 300 may have physical and electrical connectors that allow the storage module 300 to be removably connected to a host 440 (having a host controller 445) via mating connectors. As such, the storage module 300 may be a separate device from (and is not embedded in) the host 440. In this example, the storage module 300 can be a removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

Figure 8:
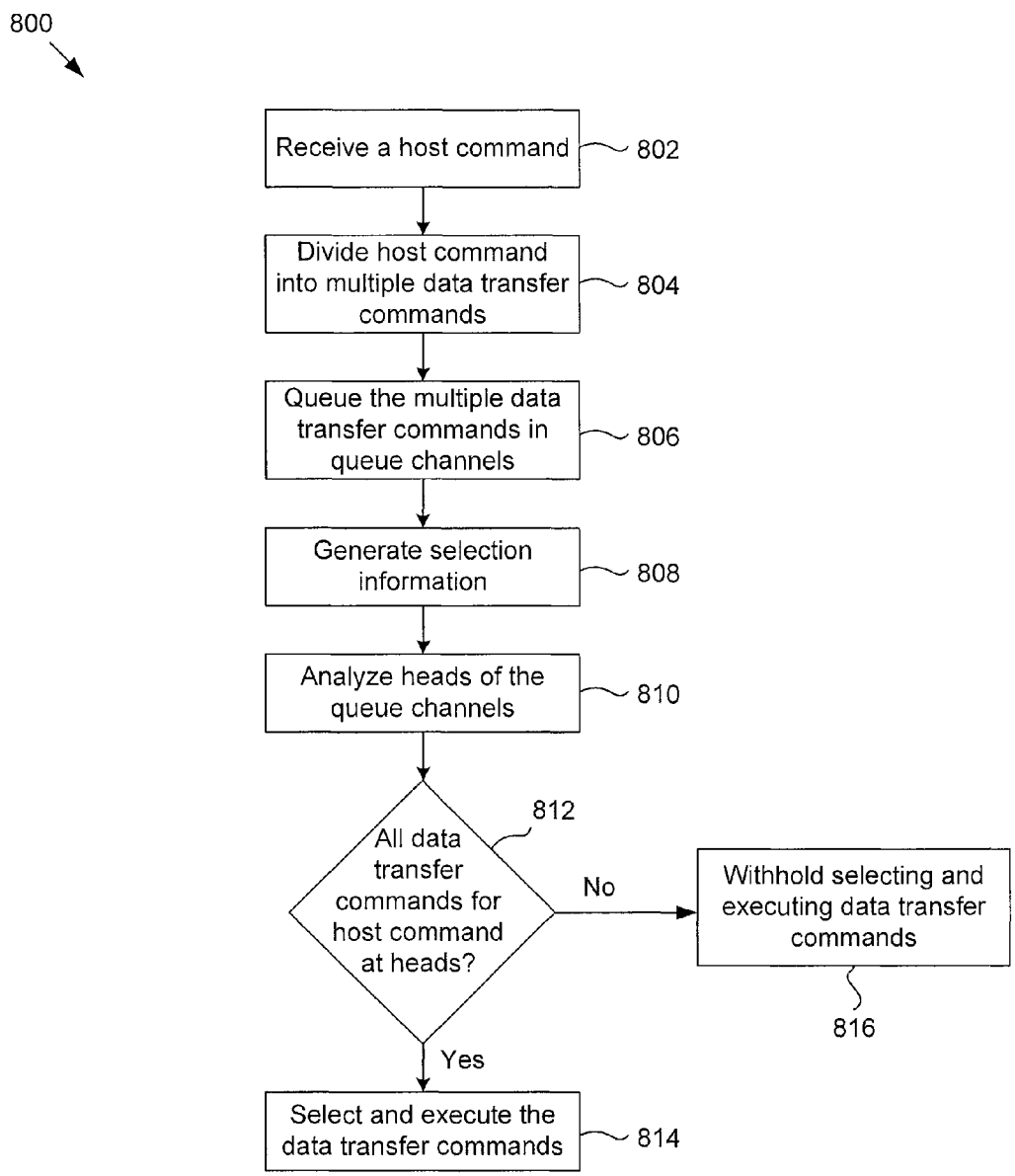
FIG. 8 is a flow chart of a method of selecting data transfer commands in queue channels.

FIG. 8 shows a flow diagram of an example method 800 of selecting data transfer commands of a host command stored in queue channels. At block 802, a host controller of a storage controller system may receive a host command from a host to perform a data transfer of data on one or more areas of a data storage. At block 804, the host controller may determine to divide the host command into a plurality of sub-host commands or data transfer commands. The determination to divide may be based on determining that multiple data transfer operations on multiple areas may be performed to completely execute the received host command. Each of the data transfer commands may correspond to an area of the data storage on which the data transfer for execution of that data transfer command is to be performed.

At block 806, the host controller may queue the multiple data transfer commands into multiple queue channels, each associated with one of the areas of the data storage. At block 808, the host controller may generate selection information that identifies the queue channels in which the data transfer commands associated with the host command are stored. The selection information may be in the form of a map that includes values (e.g., a bitmap that includes bits) indicating the presence or absence of a data transfer command in each of the queue channels for the host command. Also, at block 808, the host controller may provide the selection information to a data storage controller of the storage controller system that selects the data transfer commands for execution. In some example methods, the host controller may store the selection information in memory, which may be accessible by the data storage controller.

At block 810, the data storage controller may analyze each of the heads of the queue channels. During the analysis, the data storage controller may determine identification information that identifies the host command with which each of the data transfer commands at the heads are associated. At block 812, the data storage controller may determine whether all of the data transfer commands associated with the host command are located at the heads of the queue channels or are not being blocked by any data transfer commands associated with different host commands. The data storage controller may use and/or access the selection information to make that determination. For example, using the selection information, the data storage controller may identify the queue channels in which the data transfer commands associated with the host command are stored. The data storage controller may then compare the selection information with identification information determined from the analysis of the heads of the queues.

Based on the comparison, if the data storage controller determines that all of the data transfer commands associated with the host command are located at the heads of the queues or are unblocked by any data transfer commands associated with different host commands, then at block 814, the data storage controller may select and execute the data transfer commands associated with the host command. Alternatively, if the data storage controller determines that all of the data transfer commands are not located at the heads of the queues or at least one of the data transfer commands are being blocked by a data transfer command associated with a different host command, then at block 816, the data storage controller may withhold selection and execution of the data storage commands associated with the host command.

Figure 9:
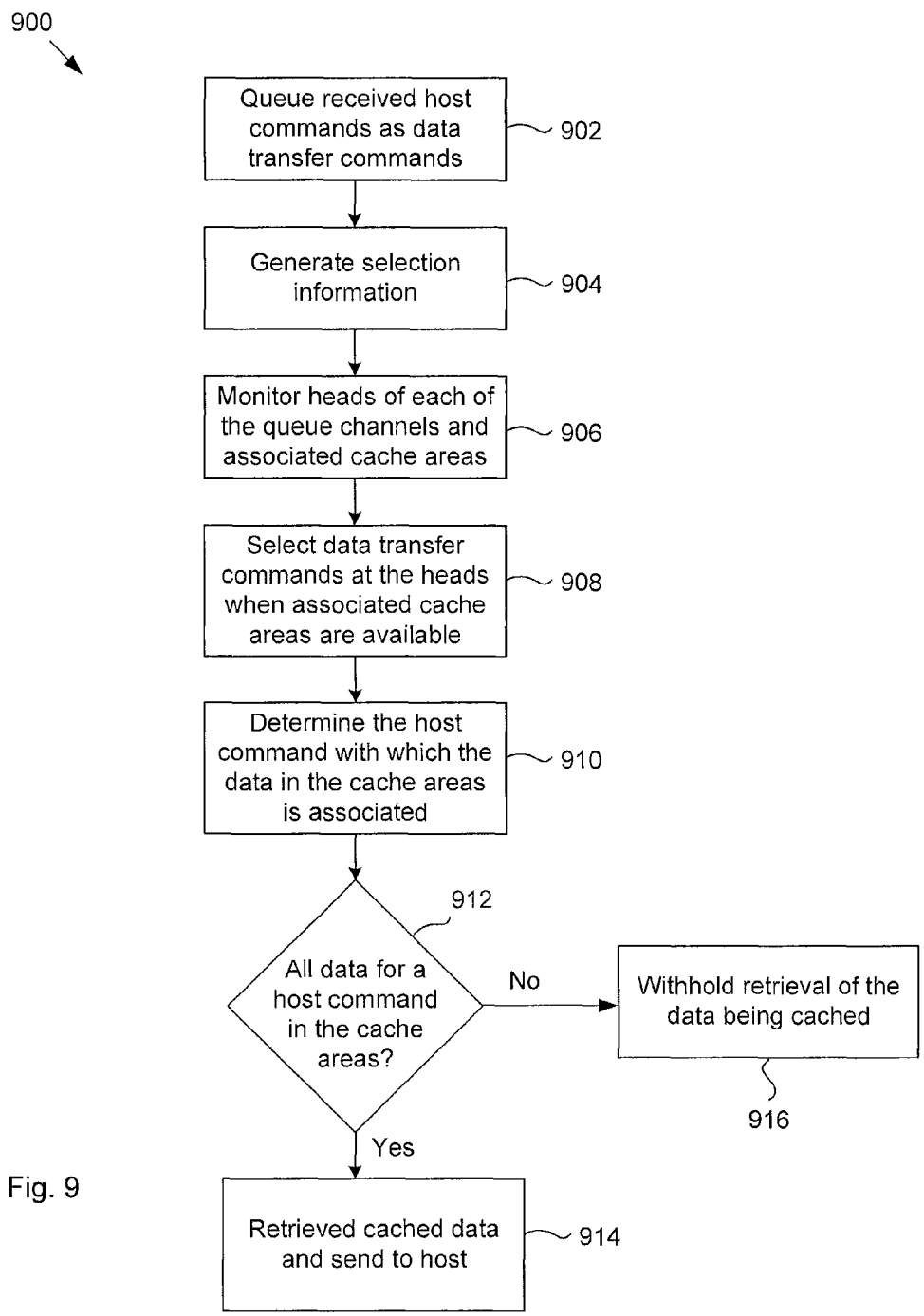
FIG. 9 is a flow chart of a method of selecting data stored in cache areas.

FIG. 9 shows a flow chart of an example method 900 of selecting data for transmission in response to receipt of host commands. At block 902, a host controller of a storage controller system may receive host commands from a host and queue the received host commands as data transfer commands in a plurality of queue channels. One or more of the commands may be a request to receive data stored in a data storage area. For each of the received host commands, upon receipt of a host command, the host controller may determine how to queue the host command. For example, the host controller may determine whether to queue the host command as multiple data transfer commands or as a single data transfer command. Additionally, the host controller may determine whether to queue the host command in a plurality of queue channels or in a single queue channel.

At block 904, for each host command, the host controller may generate selection information that indicates whether all data to be sent to the host in response to a host command is being cached in cache areas. For some examples, the selection information may include bits having values that indicate which of the cache areas are to cache data in order for all data being sent in response to a host command to be cached.

At block 906, a data storage controller may monitor a head of each of the queue channels and associated cache areas to determine whether to select data transfer commands for execution. For each queue channel, the data storage controller may determine whether there is a data transfer command at the head and whether a cache area associated with the queue channel is available to receive and store data to be transferred to the host in response to selection of the data transfer command.

At block 908, the data storage controller may select data transfer commands at the heads of the queue channels based on the determination at block 906. In particular, for each queue channel, if there is a data transfer command at the head of the queue channel and the associated cache area is available to receive and store data, then the data storage controller may select and execute the data transfer command. To execute the data transfer command, the data storage controller may access and retrieve the data stored in an associated area of data storage and send the retrieved data to the associated cache area. Alternatively, if there is not a data transfer command at the head or the associated cache area is not available to receive and store the data, then the data storage controller may determine to not select and execute the data transfer command.

At block 910, the host controller may analyze the data in each of cache areas. During the analysis, if there is data in a cache area, the host controller may determine the host command with which the data is associated. At block 912, the host controller may determine whether all of the data to be sent to the host to respond to a host command is being cached in the cache areas. The host controller may use and/or access the selection information to make the determination. For example, using the selection information, the host controller may identify which of the cache areas are to cache data in order for all data being sent in response to a host command to be cached. The data storage controller may then compare the selection information with its analysis of the cache areas.

Based on the comparison, if the data storage controller determines that all data to be sent to the host in response to a host command is being cached in the cache areas, then at block 914, the host controller may retrieve the data from the cache areas and send the data to the host. Alternatively, if the data storage controller determines that all of the data to be sent to the host in response to a host command is not being cached (i.e., there are still pending data transfer commands associated with the host command), then at block 916, the host controller may withhold retrieval of any data for response to the host command and leave the data pending in the cache areas.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another. In sum, although the present invention has been described in considerable detail with reference to certain embodiments thereof, other versions are possible. Therefore, the spirit and scope of the appended claims should not be limited to the description of the embodiments contained herein.

We claim:

1. A storage controller system comprising:
a data storage controller configured to:
determine first information that identifies at least two heads of at least two queue channels of a plurality of queue channels that at least two data transfer commands associated with a same host command are to be located at the same time before the data storage controller selects for execution any of the at least two data transfer commands located at any of the at least two heads;
determine second information that identifies associations between data transfer commands and host commands at each head of the plurality of queue channels;
compare the first information with the second information to determine whether the at least two data transfer commands associated with the same host command are located at the at least two heads at the same time; and
select for execution all of the at least two data transfer commands associated with the same host command when the comparison indicates that the at least two data transfer commands are located at the at least two heads at the same time.

2. The storage controller system of claim 1, wherein the data storage controller is further configured to:
withhold selection for execution any of the at least two data transfer commands located at the at least two heads of the at least two queue channels when the comparison indicates that at least one of the at least two data transfer commands associated with the same host command is not located at the at least two heads.

3. The storage controller system of claim 1, wherein the data storage controller is further configured to execute all of the at least two data transfer commands associated with the same host command at substantially the same time.

4. The storage controller system of claim 1, wherein the data storage controller is further configured to send to a host all data to be sent in response to the host command without any of the at least two data transfer commands associated with the host command pending in the queue channels.

5. The storage controller system of claim 1, further comprising a host controller configured to:
receive the host command from a host;
queue the received host command as the at least two data transfer commands in of the at least two queue channels; and
generate the first information based on the queue of the at least two data transfer commands in the at least two queue channels; and queued,
provide the first information to the data storage controller in order for the data storage controller to perform the comparison.

6. The storage controller system of claim 5, wherein the first information comprises a bitmap associated with the host command, and wherein the bitmap comprises a plurality of bits, each bit being associated with one of the queue channels and having a value that indicates whether a data transfer command of the at least two data transfer commands is being queued in the associated queue channel.

7. A method of selecting for execution data transfer commands stored in queue channels, the method comprising:
determining, with one or more controllers, first information that identifies at least two heads of at least two queue channels of a plurality of queue channels that at least two data transfer commands associated with a same host command are to be located at the same time before the one or more controllers selects for execution any of the at least two data transfer commands located at any of the at least two heads;
determining, with the one or more controllers, second information that identifies associations between data transfer commands and host commands at each head of the plurality of queue channels;
comparing, with the one or more controllers, the first information with the second information to determine whether the at least two data transfer commands associated with the same host command are located at the at least two heads at the same time;
selecting for execution, with the one or more controllers, all of the at least two data transfer commands when the comparing indicates that the at least two data transfer commands are located at the at least two heads at the same time; and
determining not to select for execution, with the one or more controllers, any of the at least two data transfer commands when the comparing indicates that less than all of the at least two data transfer commands associated with the same host command are located at the at least two heads of the at least two queue channels.

8. The method of claim 7, further comprising:
executing, with the one or more controllers, all of the at least two data transfer commands associated with the host command at substantially the same time.

9. The method of claim 7, further comprising:
sending, with the one or more controllers, to a host all data requested to be sent in response to the host command without any of the at least two data transfer commands associated with the same host command pending in the at least two queue channels.

10. The method of claim 7, further comprising:
receiving, with the one or more controllers, the host command from a host;
queuing, with the one or more controllers, the received host command as the at least two data transfer commands in the at least two queue channels;
generating, with the one or more controllers, the first information based on the queuing of the at least two data transfer commands in the at least two queue channels; and
accessing, with the one or more controllers, the first information to compare the first information with the second information.

11. The method of claim 10, wherein the first information comprises a bitmap associated with the host command, and wherein the bitmap comprises a plurality of bits, each bit being associated with one of the queue channels and having a value that indicates whether a data transfer command of the one or more data transfer commands is being queued in the associated queue channel.

* * * * *